United States Patent
Masuichi et al.

(10) Patent No.: US 8,073,678 B2
(45) Date of Patent: Dec. 6, 2011

(54) TRANSLATION DEVICE, TRANSLATION METHOD, AND STORAGE MEDIUM

(75) Inventors: Hiroshi Masuichi, Ashigarakami-gun (JP); Michihiro Tamune, Ashigarakami-gun (JP); Masatoshi Tagawa, Ebina (JP); Shaoming Liu, Ashigarakami-gun (JP); Kiyoshi Tashiro, Kawasaki (JP); Atsushi Itoh, Ashigarakami-gun (JP); Kyosuke Ishikawa, Minato-ku (JP); Naoko Sato, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 844 days.

(21) Appl. No.: 11/216,160

(22) Filed: Sep. 1, 2005

(65) Prior Publication Data

US 2006/0217961 A1   Sep. 28, 2006

(30) Foreign Application Priority Data

Mar. 22, 2005  (JP) ................................ 2005-082048

(51) Int. Cl.
*G06F 17/28* (2006.01)

(52) U.S. Cl. .................... 704/5; 704/2; 704/3; 704/4

(58) Field of Classification Search .................. 704/2–7
See application file for complete search history.

(56) References Cited

U.S. PATENT DOCUMENTS

| | | | |
|---|---|---|---|
| 4,593,356 A * | 6/1986 | Hashimoto et al. ............... 704/7 |
| 4,814,987 A * | 3/1989 | Miyao et al. ....................... 704/3 |
| 4,814,988 A * | 3/1989 | Shiotani et al. ...................... 704/5 |
| 4,941,195 A | 7/1990 | Tanaka et al. |
| 5,222,160 A * | 6/1993 | Sakai et al. ..................... 382/185 |
| 5,517,409 A * | 5/1996 | Ozawa et al. ....................... 704/3 |
| 5,729,618 A * | 3/1998 | Fujisawa et al. ............... 382/100 |
| 5,748,805 A * | 5/1998 | Withgott et al. ............... 382/306 |
| 5,765,179 A * | 6/1998 | Sumita et al. ................. 715/236 |
| 5,873,055 A | 2/1999 | Okunishi |
| 5,956,669 A | 9/1999 | Ozawa |
| 6,151,570 A * | 11/2000 | Fuji ................................... 704/3 |
| 6,470,306 B1 * | 10/2002 | Pringle et al. ...................... 704/3 |
| 6,937,974 B1 * | 8/2005 | d'Agostini ........................ 704/2 |
| 2001/0018649 A1 * | 8/2001 | Kasai et al. ....................... 704/3 |
| 2001/0032070 A1 * | 10/2001 | Teicher ............................. 704/2 |
| 2002/0041290 A1 * | 4/2002 | LeKuch et al. ................ 345/775 |
| 2002/0064316 A1 * | 5/2002 | Takaoka ........................ 382/305 |
| 2002/0161569 A1 * | 10/2002 | Itoh et al. .......................... 704/2 |
| 2003/0040899 A1 * | 2/2003 | Ogilvie ............................. 704/2 |
| 2004/0264811 A1 * | 12/2004 | Yano et al. ..................... 382/306 |
| 2005/0086043 A1 * | 4/2005 | Hess et al. ........................ 704/2 |

(Continued)

FOREIGN PATENT DOCUMENTS

CN   1190218 A   8/1998

(Continued)

*Primary Examiner* — James S. Wozniak
*Assistant Examiner* — Jialong He
(74) *Attorney, Agent, or Firm* — Oliff & Berridge, PLC

(57) ABSTRACT

A translation device has a dictionary that stores a set of words and their corresponding meanings in plural languages; an input unit that inputs a document; a recognizing unit that recognizes text in the inputted document; an analyzing unit that devides the text recognized by the recognizing unit into words; a translating unit that translates each of the words obtained by the analyzing unit into a translated term by using the dictionary; and an output unit that outputs an output image containing the translated term for a key word.

11 Claims, 3 Drawing Sheets

U.S. PATENT DOCUMENTS

2005/0219616 A1 * 10/2005 Furuta et al. ............. 358/1.18

FOREIGN PATENT DOCUMENTS

| EP | 0 858 042 A2 | | 8/1998 |
|---|---|---|---|
| JP | A 62-154845 | | 7/1987 |
| JP | 05-263212 | * | 5/1995 |
| JP | A 9-284446 | | 10/1997 |
| JP | A 2005-14237 | | 1/2005 |

* cited by examiner

TRANSLATION DEVICE, TRANSLATION METHOD, AND STORAGE MEDIUM

BACKGROUND OF THE INVENTION

1. Field of the Invention

The present invention relates to a method, a device, and a storage medium for translation of a document from one language to another language.

2. Description of the Related Art

Machine translation of documents from one language to another has long been a subject of study.

Since a machine translation of a whole document takes a considerable amount of time, a user must wait until the whole document has been machine-translated and the translation sheet ejected.

In some instances, a user does not need to obtain a complete and exact translation of a document. For example, s/he may need only a partial translation of a document; or to obtain a complete and exact translation of only a specific portion of a document in order to obtain an overall view of the document.

In the latter case, if a complete and exact translation of a document is nonetheless performed a user's time will be wasted.

SUMMARY OF THE INVENTION

The present invention has therefore been made in view of the above problems inherent in the related art, and provides a translation device including: a dictionary that stores a set of words and their corresponding meanings in plural languages; an input unit that inputs a document; a recognizing unit that recognizes text in the inputted document; an analyzing unit that divides the text recognized by the recognizing unit into words; a translating unit that translates each of the words obtained by the analyzing unit into a translated term by using the dictionary; and an output unit that outputs an output image containing the translated term for a key word.

BRIEF DESCRIPTION OF THE DRAWINGS

Embodiments of the present invention will be described in detail based on the following figures, wherein.

DETAILED DESCRIPTION OF THE INVENTION

A. Configuration

Translation device 1 is adapted to translating a document into a target language, and is adapted to generating a copy of the translated document.

Figure 1:
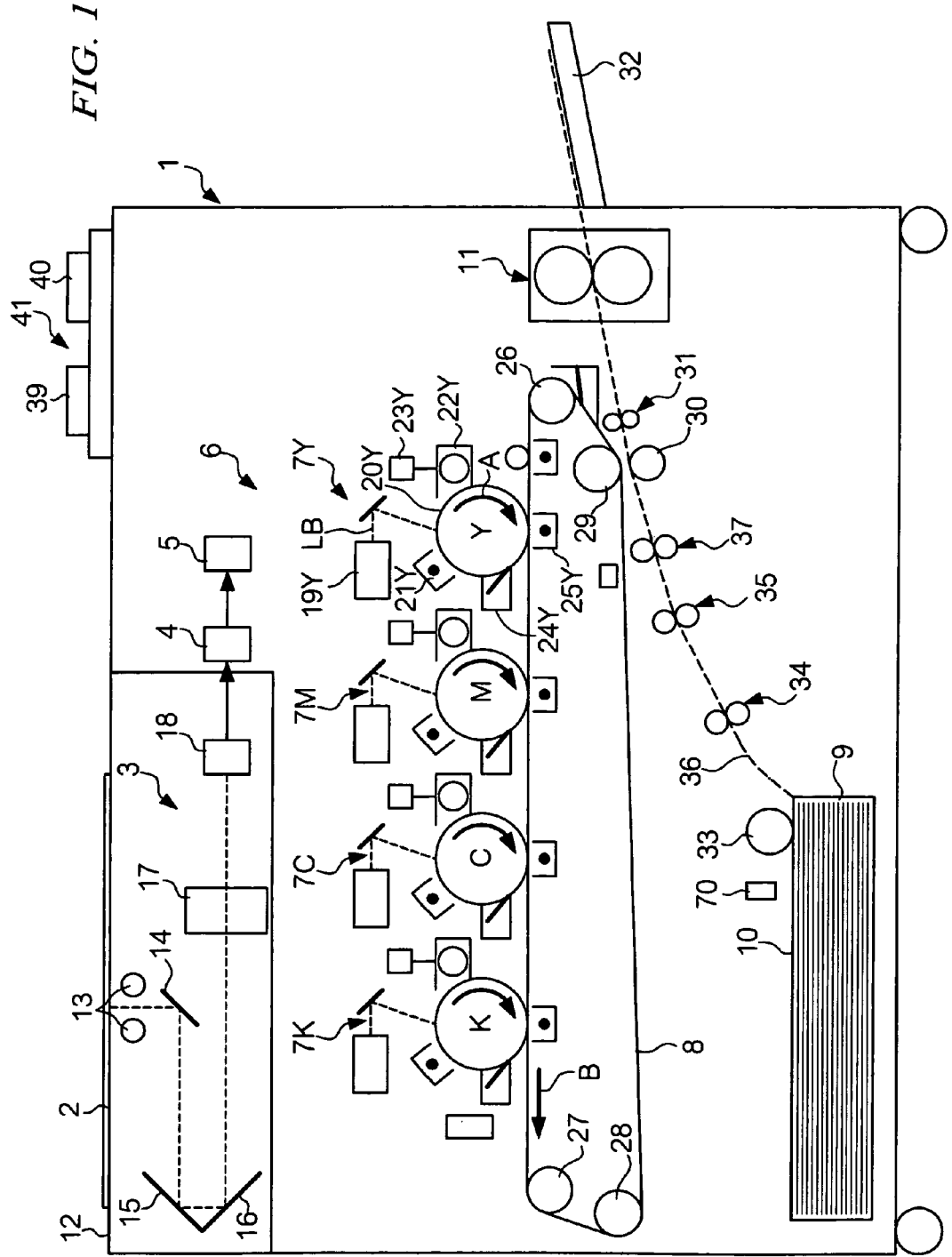
FIG. 1 illustrates a hardware configuration of translation device 1.

FIG. 1 illustrates a hardware configuration of translation device 1. Translation device 1 has a control unit 4. Control unit 4 includes a CPU (Central Processing Unit), a ROM (Read Only Memory), and a RAM (Random Access Memory), which are not shown in FIG. 1. CPU executes OS (Operating System) programs stored in ROM to control components of translation device 1.

Storage unit 5 is non-volatile, and is configured as a hard disk drive unit or the like. Storage unit 5 stores computer programs for executing operations, such as inputting, translating, and outputting a document. Storage unit 5 stores a known OCR (Optical Character Recognition) program for executing character recognition. Storage unit 5 also stores dictionary 51.

Dictionary 51 stores a set of words and their corresponding meanings in plural languages. Dictionary 51 also stores for each word a flag indicating whether a word is a key word or an ancillary word on the basis of which CPU can determine whether a word that must be translated is a key word or an ancillary word. It is noted that a word which is a noun, a verb, or an adjective and that may constitute a paragraph in itself will hereinafter be referred to as a key word; whereas a word which is a particle or an auxiliary verb will hereinafter be referred to as an ancillary word.

Instruction input unit 41 has a keyboard 40 with a ten keypad and a start button, and has a display unit 39 including an LCD panel with a touch panel function. A user may input instructions into translation device 1 via instruction input unit 41. In case of malfunctions of translation device 1, the status of translation device 1 may be displayed at display unit 39.

Sheets 10 adapted for having images formed thereon are stacked on paper feed tray 9. When an instruction to form images on a sheet 10 is input via instruction input unit 41, paper feed roller 33 starts rotating, and feeds sheets 10 one-by-one from paper feed tray 9. Sheets 10 are conveyed along conveyance path 36 by means of paired rollers 34, 35, and 37.

Image input unit 12 reads a document optically, and generates image data.

Image input unit 12 may be configured as a scanning unit. More specifically, light is radiated from light source 13 onto a document put on platen glass 2. Light from the document is reflected via mirrors 14, 15, and 16 and received by light reception unit 17. Image processing unit 18 converts the reflected light received by light reception unit 17 to electric signals, so as to generate image data consisting of colors of Yellow (Y), Magenta (M), Cyan (C), and Black (K).

Image forming unit 6 has image forming mechanisms 7Y, 7M, 7C, and 7K, and a transferring belt 8.

Image forming mechanisms 7Y, 7M, 7C, and 7K form toner images of a single color of Yellow, Magenta, Cyan, and Black, respectively. Since these image forming mechanisms have identical configurations, only explanatory details of image forming mechanism 7Y will be described.

Image forming mechanism 7Y includes a photoconductive drum 20Y (image support member), on which an electro-static latent image is formed, and by which toner image is supported. Image forming mechanism 7Y also includes an electro-static charging unit 21Y, an exposure unit 19Y, a development unit 22Y, and a cleaning unit 24Y around photoconductive drum 20Y.

Electro-static charging unit 21Y uniformly charges the whole surface of photoconductive drum 20Y to a certain electric potential of uniform polarity, while photoconductive drum 20Y is rotating in a direction of arrow A.

Exposure unit 19Y radiates a beam of light on the surface of photoconductive drum 20Y in accordance with image data.

Exposure unit 19Y may be configured as a Raster Output Scanner. More specifically, exposure unit 19Y scans a laser beam emitted from a semiconductor laser unit (not shown) in accordance with image data, so as to form an electro-static latent image on the surface of photoconductive drum 20Y After the laser beam is radiated on an area of the surface of photoconductive drum 20Y, the electric potential of the area gets reduced in accordance with the intensity of the laser beam due to photoconductivity of photoconductive drum 20Y. Thus, an electrostatic latent image corresponding to the image data is formed on the surface of photoconductive drum 20Y.

Development unit 22Y develops the electrostatic latent image formed on the surface of photoconductive drum 20Y. More specifically, a toner (electrostatically charged color pigmental material) is charged with the same polarity as the surface of photoconductive drum 20Y. Then, the toner is fed from toner tank 23Y to the surface of photoconductive drum 20Y, so as to generate a toner image on the surface of photoconductive drum 20Y. Thus a toner image, which is a negative image of the electrostatic latent image, is formed on the surface of photoconductive drum 20Y.

Transferring belt 8 is hung on rollers 26, 27, 28, and 29, and is driven rotatingly in the direction of arrow B. Transferring belt 8 runs below photoconductive drum 20Y. When photoconductive drum 20Y is pressed against transferring belt 8, the toner image formed on the photoconductive drum 20Y is transferred to transferring belt 8.

Cleaning unit 24Y removes residual toner from photoconductive drum 20Y.

Similarly, in image forming mechanisms 7M, 7C, and 7K, a toner image of each color is formed on photoconductive drum 20M, 20C, and 20K, respectively. The toner image of each color is overlappingly and successively transferred to transferring belt 8.

In the descriptions below, where it is not necessary to distinguish between image forming mechanisms 7Y, 7M, 7C, and 7K, they are collectively referred to as image forming mechanism 7. Similarly, where it is not necessary to distinguish between colors for other components, the notations Y, M, C, K will also be omitted.

After sheet 10 is fed from paper feed tray 9 on conveyance path 36, sheet 10 enters the nip portion formed between transferring belt 8 and transfer roller 30, and is pressed against transferring belt 8. The pressing force and electrostatic suction force exerted by sheet 10 enable the toner image to be transferred onto the surface of sheet 10.

Then sheet 10 is guided into fusing unit 11 by paired roller 31, fusing unit 11 presses and heats sheet 10 so that the toner is fused to the surface of sheet 10. Thus, an image is formed on sheet 10, and sheet 10 is ejected to catch tray 32.

B. Functions

Figure 2:
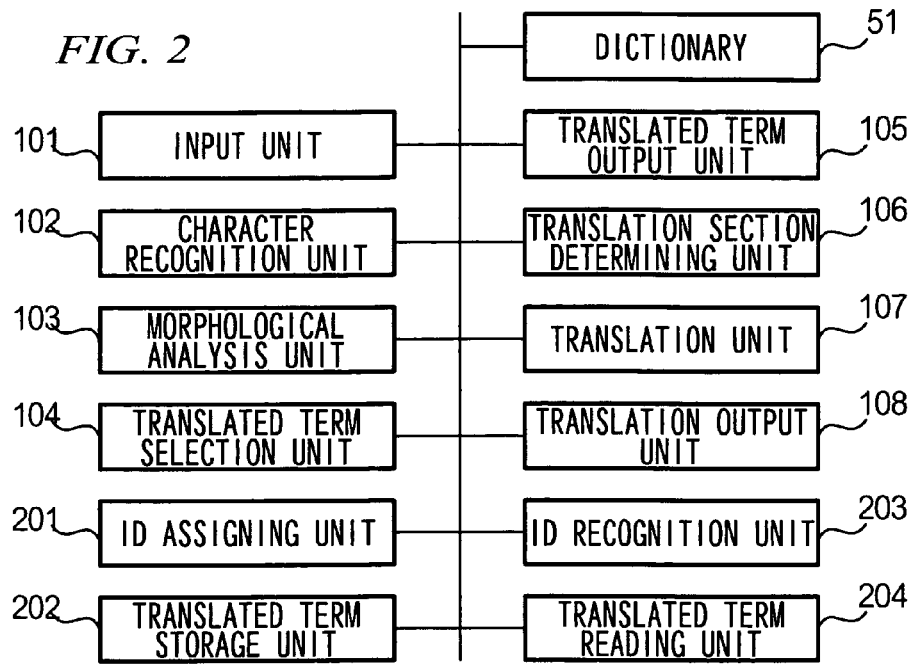
FIG. 2 illustrates a functional block diagram of translation device 1.

FIG. 2 illustrates a functional block diagram of translation device 1. CPU executes programs stored in storage unit 5 to perform translation functions.

Input unit 101 inputs a document by using image input unit 12, and generates image data of the document.

Character recognition unit 102 recognizes text in the document from the image data generated by input unit 101.

Morphological analysis unit 103 obtains words from the text by dividing the text, once it is recognized by character recognition unit 102, into morphemes (such as words).

Translated term selection unit 104 selects from dictionary 51 a translated term for each of the words obtained by morphological analysis unit 103.

Translated term output unit 105 generates an output image containing the translated terms selected by translated term selection unit 104 for translating key words. More specifically, translated term output unit 105 causes image forming unit 6 to form the output image on the surface of a sheet and to eject the sheet to catch tray 32.

Figure 3:
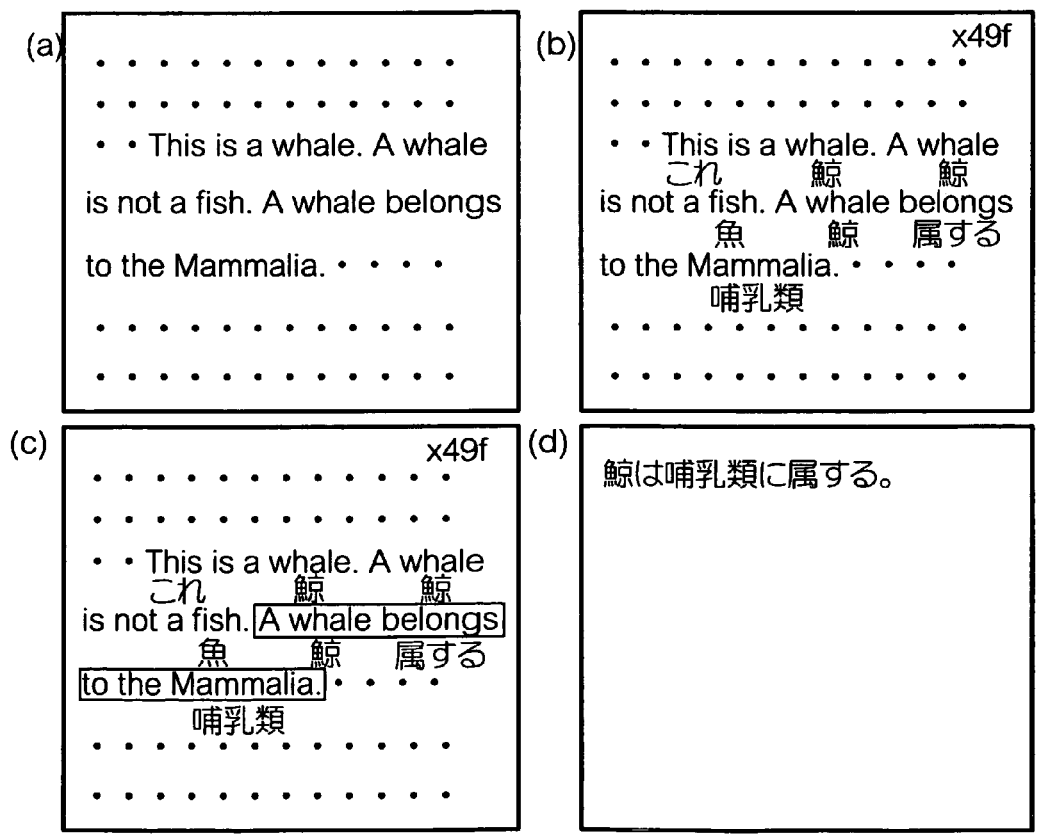
FIGS. 3(a), 3(b), 3(c), and 3(d) illustrate examples of a document to be translated, an output image including translations of key words, an output image with mark-up, and an output image of the translation.

The output image generated by translated term output unit 105 may be laid out freely. For example, the output image is laid out to include the original layout of a sheet image of a document to be translated (see FIG. 3(a)) and images of the translated terms of key words are inserted below the corresponding key words between lines of the text in the original document, as illustrated in FIG. 3(b). The document ID of the document may be printed at the upper right end of the margin of a sheet.

Translation section determining unit 106 determines a section(s) of the text in a document which are to be translated, from the image data of the document.

Translation unit 107 translates the section(s) in the document determined for translation by translation section determining unit 106 into a target language. More specifically, translation unit 107 uses, for example, known syntax and semantic analysis methods to analyze the syntax of a document, generate a syntax tree, and convert the generated syntax tree into a target language. Translation unit 107 selects a translation of each morpheme to generate a translation of the document.

Translation output unit 108 outputs an output image containing the translation of the document generated by translation unit 107. More specifically, translation output unit 108 causes image forming unit 6 to form the output image on the surface of a sheet, and to eject the sheet into catch tray 32.

ID assigning unit 201 assigns a unique ID (hereinafter referred to as document ID) to a document. A document ID may be given in any form to identify a document uniquely. For example, a document ID may consist of alphanumeric characters.

Translated term storage unit 202 stores a set of document IDs assigned to a document, words obtained from the document, and translated terms of the words in storage unit 5.

ID recognition unit 203 recognizes a document ID assigned to a document from the image data of the document.

Translated term reading unit 204 reads a set of words contained in the document having the document ID and a corresponding translation of the terms from storage unit 5.

C. Operations

Figure 4:
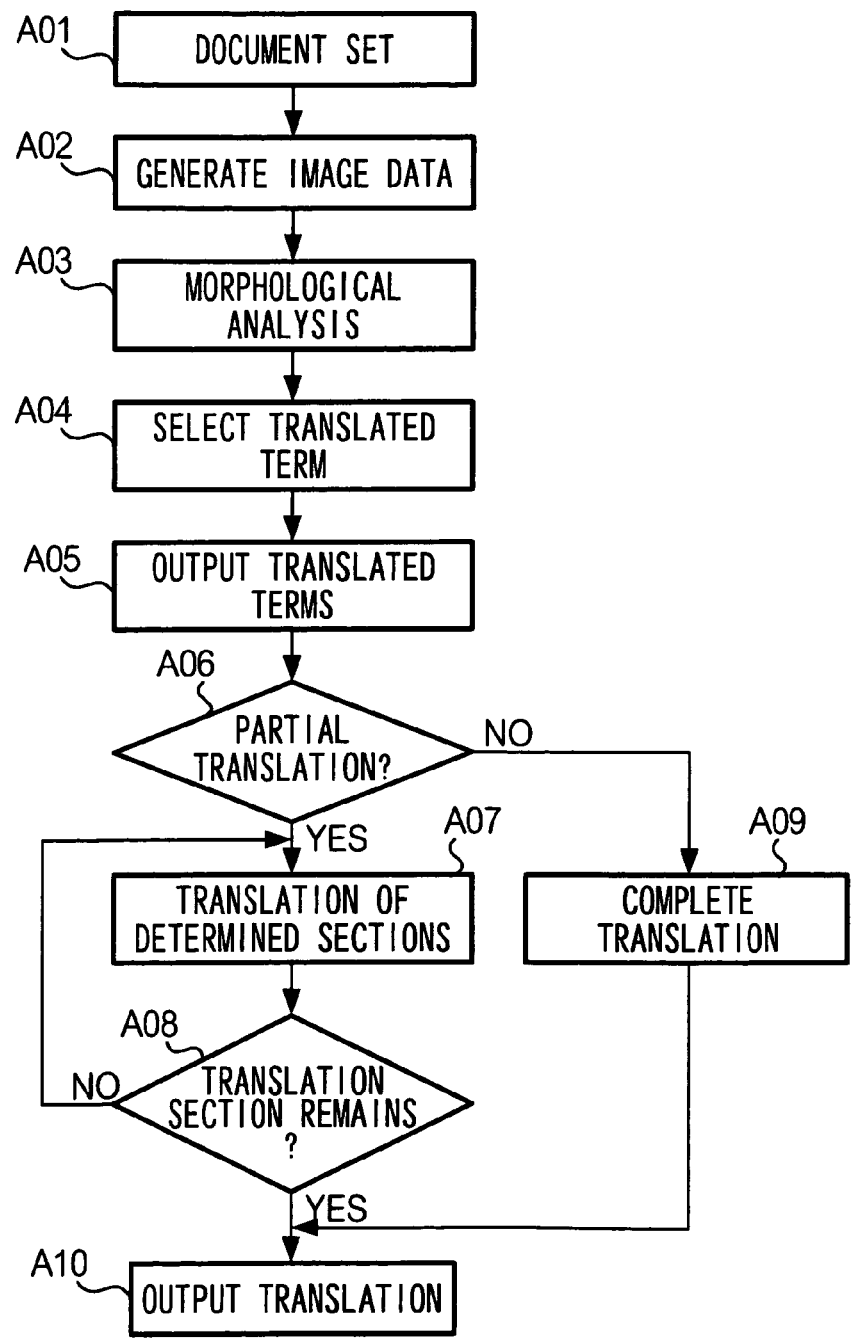
FIG. 4 illustrates an operational flow of translation device 1.

FIG. 4 illustrates an operational flow of translation device 1. In FIG. 4, it is assumed that translation device 1 has already been turned on and CPU is running computer programs.

A user places a paper document (hereinafter referred to as document) facedown on platen glass 2. When a start button is pressed at instruction input unit 41, CPU generates image data of the document by using input unit 101 (in step A01), and stores the image data in storage unit 5. FIG. 3(a) illustrates an example of the document to be translated.

CPU also assigns a unique ID to the document by using ID assigning unit 201. In the present embodiment, a unique ID 'x49f' is assigned.

In step A02, CPU recognizes sections of text contained in the document by using character recognition unit 102.

In step A03, CPU obtains words from the sections of text recognized in step A02 by dividing the text into morphemes by using morphological analysis unit 103.

In step A04, CPU selects a translated term for each of the words obtained in step A03 from dictionary 51 by using translated term selection unit 104.

CPU stores a set of unique IDs of the document, words included in the text obtained from the document, and the translated terms of the words in storage unit 5.

In step A05, CPU prints out a sheet of an output image containing the translated terms of key words by using translated term output unit 105. FIG. 3(b) illustrates an example of the output image. As illustrated in FIG. 3(b), a document ID 'x49f' is printed at the upper right end of the margin of a sheet.

The user determines translation section(s) of text in a document which are to be translated, by referring to the printout sheet of the output image containing the translated terms. The user marks up the section(s) of the text determined for translation on the printout sheet with a highlight pen or the like. In the present example, the user determines that the section, "A whale belongs to Mammalia." must be translated, and marks the section with a highlight pen (the section is enclosed in an open rectangle in FIG. 3(c)). Alternatively, the translated term(s) may be marked up to define the section(s).

The user places the printout sheet facedown on platen glass 2. When an instruction for translating the document is input into instruction input unit 41, CPU generates image data of the marked-up sheet by using image input unit 12.

In step A06, CPU determines if there is/are a section(s) marked with a specific color (hereinafter referred to as marked section) in the image data of the printout sheet by using translation section determining unit 106.

If there is no marked section (in step A06:No), CPU branches its operation to step A09; and generates a complete translation of the document from the image data, otherwise, CPU advances its operation to step A07.

In step A07, CPU recognizes a document ID assigned to a document from the image data of the document by using ID recognition unit 203. CPU reads a set of words corresponding to the document ID and the translated terms of the words from storage unit 5. CPU translates the section using the translated terms by using translation unit 107.

In step A08, CPU determines if all section(s) have been translated. If all section(s) have been translated (in step A08: YES), CPU advances its operation to step A10, otherwise CPU returns its operation to step A07.

In step A10, CPU outputs the output image of the translation by using translation output unit 108. FIG. 3(d) illustrates the output translation described in the present example.

Accordingly, a user can obtain an overview of a document from an output image containing translated terms of key words of a document. Specific section(s) in a document may then be translated. Thus a translation of a document according to a desired depth and detail may be obtained within a minimal amount of time.

C. Modifications (1) CPU may start generating a complete translation of the document immediately after printing out a sheet of an output image containing the translated terms of key words in step A05. Accordingly, CPU may translate the document while the user is determining which section(s) in the document is/are to be translated. Thus, waiting time for a complete translation of a document may be reduced to a minimal amount of time, when no section(s) is/are specified.

(2) Section(s) which is/are to be translated may be specified on a screen displayed at a display unit, such as an LCD display unit. CPU displays an output image containing the translated terms of key words in the document. The user may specify the section of a document to be translated by indicating the start and end points of the section with a pointing device, such as a mouse. Accordingly, the section to be translated may be specified in a shorter amount of time without having to printout the sheet of the output image.

(3) The translated term(s) may be laid out in various forms in the output image containing the term(s) which is/are to be translated. In one example, only translated terms of key words are laid out in the output image without including an image of the document. In another example, an output image of the document which is to be translated is laid out on the top of a sheet, whereas translated terms of key words contained in the page are laid out collectively on the lower side of the sheet.

(4) The section(s) which is/are to be translated may be specified on a sheet in various determinable forms. For example, the section(s) may be underlined.

(5) Image input unit 12 may be a separate scanning device connected to translation device 1 via a network. Image forming unit 6 may be a separate printing device connected to translation device 1 via a network.

As described above, the present invention provides a translation device including: a dictionary that stores a set of words and their corresponding meanings in plural languages; an input unit that inputs a document; a recognizing unit that recognizes text in the inputted document; an analyzing unit that divides the text recognized by the recognizing unit into words; a translating unit that translates each of the words obtained by the analyzing unit into a translated term by using the dictionary; and an output unit that outputs an output image containing the translated term for a key word.

The present invention provides a method including: assigning a unique ID to the document; storing, in a memory, a set of unique IDs assigned to the document, words obtained from the document, and the translated term for the words; recognizing a unique ID from the output image containing the translated term for a key word; and reading from the memory a set of words and their translated terms corresponding to the unique ID recognized, wherein the set of words and their translated terms are used in the translating step.

The present invention provides a computer-readable storage medium for storing a program of instructions executable by the computer to perform a function, the function including: assigning a unique ID to the document; storing, in a memory, a set of unique IDs assigned to the document, words obtained from the document, and the translated term for the words; recognizing a unique ID from the output image containing the translated term for a key word; and reading from the memory a set of words and their translated terms corresponding to the unique ID recognized, wherein the set of words and their translated terms are used in the translating step.

Accordingly, image data is generated from a document which is to be translated; translated terms for key words; translation of a specified section of the document is generated.

Thus, a translation of a document according to a desired depth and detail may be obtained within a minimal amount of time.

The foregoing description of the embodiments and modifications of the present invention has been provided for the purpose of illustration and description. It is not intended for the above description to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to a particular use contemplated. It is intended that the scope of the invention be defined by the following claims and their equivalents.

The entire disclosure of Japanese Patent Application No. 2005-82048 filed on Mar. 22, 2005, including specification, claims, drawings, and abstract is incorporated by reference in its entirety.

What is claimed is:

1. A translation device, comprising:
a dictionary that stores a set of words and their corresponding meanings in a plurality of languages;
an input unit that inputs a document;
a translated term selection unit that selects from the dictionary a translated term for each of words in the input document;
a translated term output unit that outputs an output image on a paper document, containing the translated terms;
a section determining unit that, after the output image on the paper document is outputted from the translated term output unit and the paper document is inputted into the input unit, determines a section of a text to be translated in the output image on the paper document;
a translating unit that translates the text of the determined section;
a translation output unit that outputs the translated text;
an ID assigning unit that assigns a unique ID to the document;
a memory that stores the unique ID, the words, and the translated terms for the words;
an ID recognizing unit that recognizes the unique ID from the output image on the paper document; and
a reading unit that reads from the memory, the words and the translated terms for the words corresponding to the recognized unique ID.

2. The translation device according to claim 1, wherein
the section determining unit determines by a user drawn mark denoting a selection of a section of a text containing more than one word and at least one translated word to be translated in the output image on the paper document.

3. A translation device, comprising:
a dictionary that stores a set of words and their corresponding meanings in a plurality of languages;
an input unit that inputs a document;
a translating unit that translates each of the words described in the input document into a translated term by using the dictionary;
an output unit that outputs an output image on a paper document, containing the translated terms;
a section determining unit that, after the output image on the paper document is outputted from the output unit and the paper document is inputted into the input unit, determines a section of a text to be translated in the output image on the paper document, wherein the translating unit translates the text of the section determined by the section determining unit;
an ID assigning unit that assigns a unique ID to the document;
a memory that stores the unique ID, the words, and the translated terms for the words;
an ID recognizing unit that recognizes the unique ID from the output image on the paper document; and
a reading unit that reads from the memory, the words and the translated terms for the words corresponding to the recognized unique ID.

4. The translation device according to claim 3,
wherein the section determining unit determines a section of a text to be translated by detecting a mark applied to the paper document.

5. The translation device according to claim 3, wherein the translating unit translates all of the document when the section determining unit cannot determine a designated section of text to be translated in the output image.

6. The translation device according to claim 3, wherein the translating unit selects a translated term only for words that are classified as a one of a noun, a verb or an adjective.

7. The translation device according to claim 3, wherein
the section determining unit determines by a user drawn mark denoting a selection of a section of a section of a text containing more than one word and at least one translated word to be translated in the output image on the paper document.

8. A translation method, comprising:
inputting a document;
performing, on a processor, a selection from a dictionary of a translated term for a predetermined key word in the input document;
outputting an output image, on a paper document, representing the translated term for the predetermined key word;
scanning the paper document, on which the output image has been outputted and a mark that has been drawn by a user, to input an image of the paper document;
determining a section of the input image of the paper document obtained by the scanning of the paper document as the section to be translated, the section being denoted by the mark drawn by the user on the paper document;
translating the text of the determined section;
outputting the translated text;
dividing the text recognized into words:
assigning a unique ID to the document;
storing, in a memory, the unique ID, the words and the translated terms for the words;
recognizing the unique ID from the inputted output image; and
reading from the memory, the words and the translated terms for the words corresponding to the recognized unique ID.

9. The translation method according to claim 8, further comprising:
forming the output image on the paper document; and
detecting a section of a text being marked up in a prescribed manner on the paper document, to determine the section to be translated.

10. The translation method according to claim 8, further comprising:
translating all of the document when a designated section of text cannot be determined.

11. The translation method according to claim 8, wherein a translated term is selected only for words that are classified as a one of a noun, a verb or an adjective.

* * * * *